US008446268B2

(12) United States Patent
    Hideshiro

(10) Patent No.: US 8,446,268 B2
(45) Date of Patent: May 21, 2013

(54) SYSTEM FOR DISPLAYING VIEWS OF VEHICLE AND ITS SURROUNDINGS

(75) Inventor: Fujie Hideshiro, Chiba (JP)

(73) Assignees: Hyundai Motor Japan R&D Center, Inc., Yokohama (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 699 days.

(21) Appl. No.: 12/576,721

(22) Filed: Oct. 9, 2009

(65) Prior Publication Data

US 2010/0259372 A1     Oct. 14, 2010

(30) Foreign Application Priority Data

Apr. 14, 2009   (JP) ................. 2009-097685

(51) Int. Cl.
    *B60Q 1/00*     (2006.01)
(52) U.S. Cl.
    USPC .................. 340/435; 340/901; 348/148
(58) Field of Classification Search
    USPC ............... 340/435, 433, 901, 932.2; 348/148
    See application file for complete search history.

(56) References Cited

U.S. PATENT DOCUMENTS

| | | | | |
|---|---|---|---|---|
| 5,969,969 | A * | 10/1999 | Ejiri et al. ................. | 701/41 |
| 6,956,469 | B2 * | 10/2005 | Hirvonen et al. ............ | 340/435 |
| 7,298,247 | B2 * | 11/2007 | Shimizu .................... | 340/435 |
| 2004/0090314 | A1 * | 5/2004 | Iwamoto .................... | 340/425.5 |
| 2006/0119472 | A1 * | 6/2006 | Tsuboi ...................... | 340/435 |
| 2007/0003108 | A1 * | 1/2007 | Chinomi et al. ............ | 382/104 |
| 2007/0057816 | A1 * | 3/2007 | Sakakibara et al. ........ | 340/932.2 |
| 2007/0206833 | A1 * | 9/2007 | Otsuka et al. .............. | 340/435 |
| 2007/0222565 | A1 * | 9/2007 | Kawamata et al. .......... | 340/435 |
| 2008/0012940 | A1 * | 1/2008 | Kanaoka et al. ............ | 340/435 |

FOREIGN PATENT DOCUMENTS

| | | |
|---|---|---|
| JP | 2007-295043 A | 11/2007 |
| JP | 2008-011187 A | 1/2008 |
| JP | 2008-030705 A | 2/2008 |
| KR | 10-2001-0112433 | 12/2001 |

* cited by examiner

*Primary Examiner* — Thomas Mullen
(74) *Attorney, Agent, or Firm* — Edwards Wildman Palmer LLP; Peter F. Corless

(57) ABSTRACT

The present invention provides a system for displaying views of a vehicle and its surroundings. Preferably, the system for displaying views of a vehicle and its surroundings includes one or more cameras for photographing a vehicle and its surroundings, obstacle detection means for detecting an obstacle outside the vehicle, a memory unit for previously storing alternative views corresponding to the obstacle, and a view processing unit for creating a bird's eye view from a virtual viewpoint outside the vehicle based on views acquired by the cameras. When the obstacle detection means detects the obstacle, the view processing unit secures the obstacle, selects an alternative view corresponding to the secured obstacle, reads the alternative view from the memory unit, changes a direction and inclination of the selected alternative view in line with the virtual viewpoint, and then overlaps the changed alternative view on the bird's eye view.

12 Claims, 20 Drawing Sheets

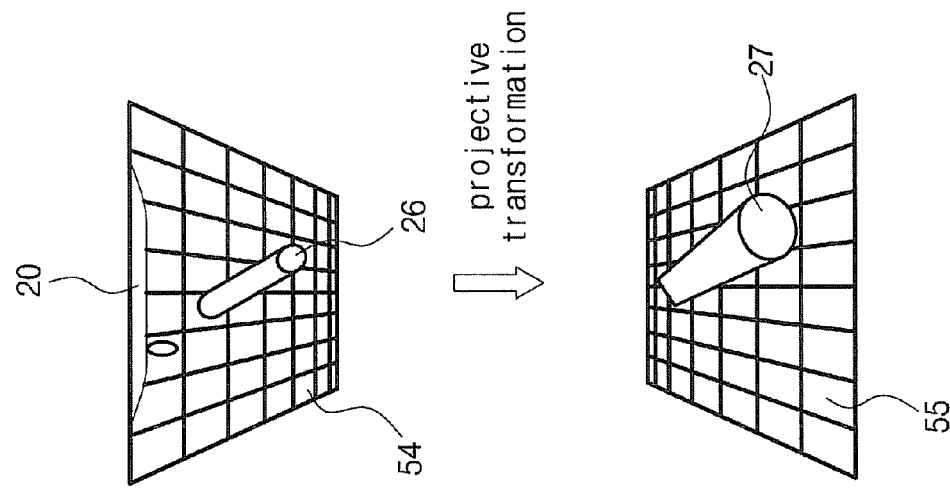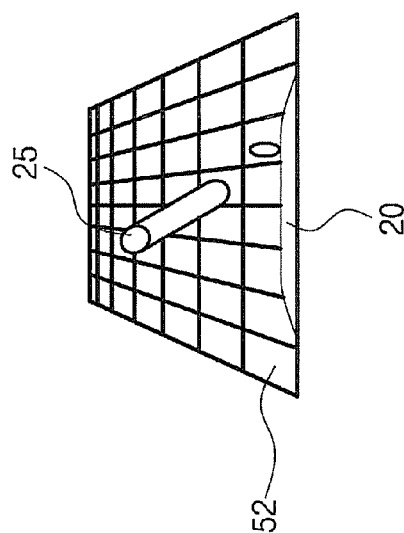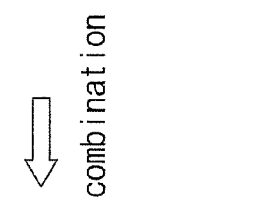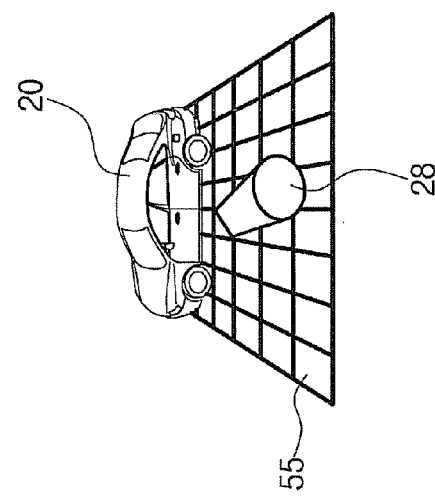

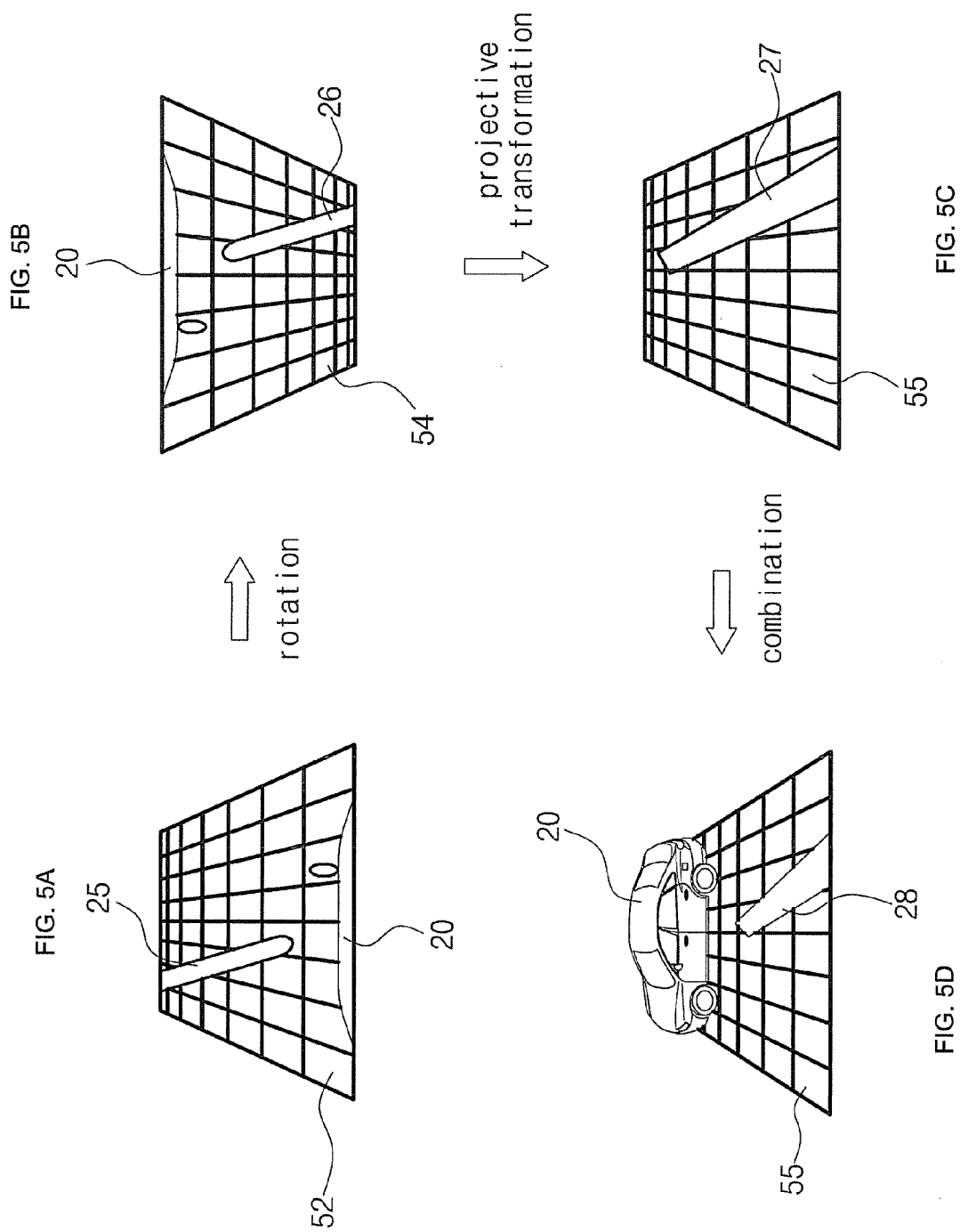

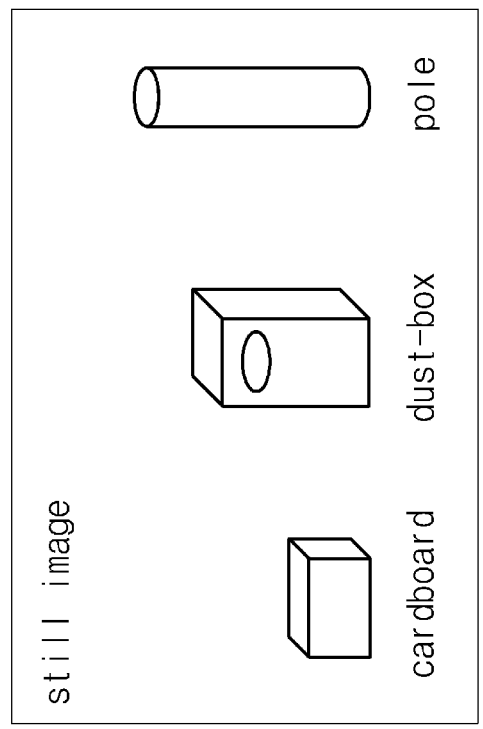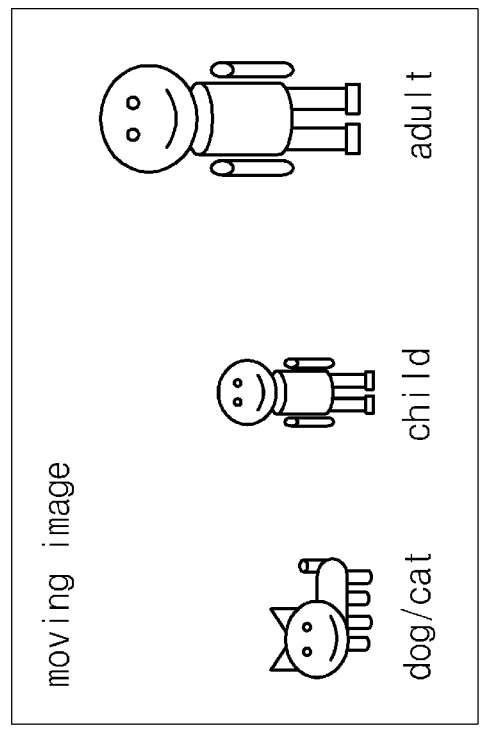
FIG.9

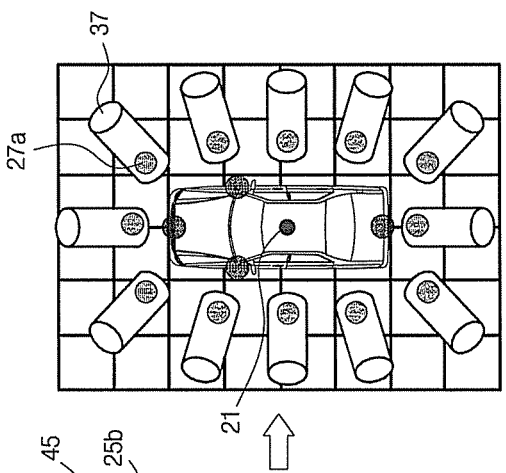
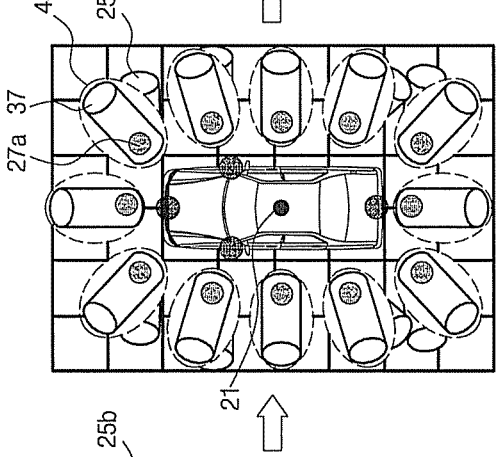
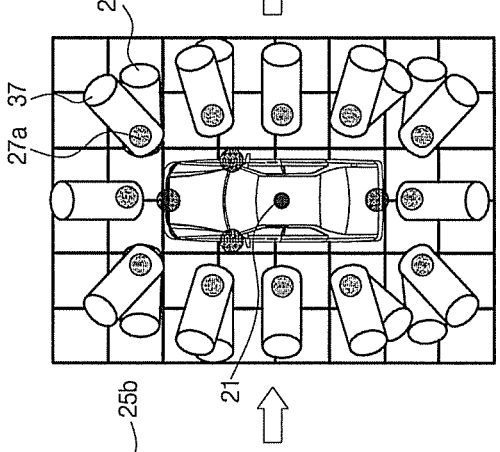
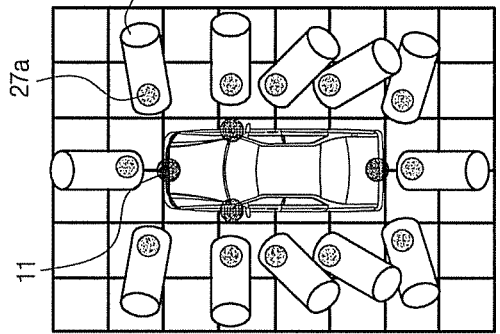

SYSTEM FOR DISPLAYING VIEWS OF VEHICLE AND ITS SURROUNDINGS

CROSS-REFERENCE TO RELATED APPLICATION

This application claims under 35 U.S.C. §119(a) the benefit of Japanese Patent Application No. 2009-097685 filed Apr. 14, 2009, the entire contents of which are incorporated herein by reference.

BACKGROUND (a) Technical Field

The present invention relates, in general, to technology for displaying views of a vehicle, such as an automobile, and its surroundings. More particularly, the present invention relates to technology that is capable of, when displaying a combined bird's eye view of a vehicle and its surroundings based on views of the vehicle and surroundings acquired from a plurality of cameras for photographing a vehicle and its surroundings, displaying a three-dimensional (3D) object, where the 3D object may, for example be an object or obstacle which may disturb driving, or a human body which may be harmed while driving; hereinafter referred to as the "obstacle") in the bird's eye view without suitably causing a sense of incongruity.

(b) Background

An example of a system for combining views from a plurality of cameras on a vehicle with an alternative view of the vehicle and providing a bird's eye view of the vehicle taken from a virtual viewpoint above the vehicle to a driver includes, for example, the "Around View Monitor" of Nissan Motor Co. Ltd.

However, in employing this type of conventional technology in the bird's eye view, an obstacle is viewed as being laid down flat on a road surface. Furthermore, in this type of technology, it is suitably impossible to display the part of an obstacle, that is, the part of an object, having a height which is suitably outside the photographable range of the cameras. Further, in employing this type of technology, there also arises the sense of incongruity in which an object having a height is viewed as extending out of a vehicle in the form of a rectilinear line which connects the location of a camera with the location of the object on a road surface.

Japanese Unexamined Patent Publication No. 2003-189293, incorporated by reference in its entirety herein, is directed to technology that, when part of an obstacle is detected in the range in which a camera cannot photograph it (the side behind the obstacle which is viewed from the camera), determines the non-photographed part using the location of the edge of the detected obstacle facing the vehicle and filling in the part with an alternative view. However, this technology is related with the display of a top view, and does not disclose an improvement in the display of a bird's eye view of an area outside a vehicle, for example, an area behind or beside the vehicle. Furthermore, since dynamic representation is not included in an alternative view of an obstacle, the ability to call attention to the motion of an obstacle, such as a human, is low.

Japanese Unexamined Patent Publication No. Hei 7-223488, incorporated by reference in its entirety herein, is directed to technology that, when an obstacle is detected, displays a schematic figure (a static alternative view) at a location where the obstacle is detected according to the type of detected obstacle (e.g., a human, a bicycle, a vehicle, or the like).

However, this type of display of an obstacle is not accompanied with an indication of the presence of a motion or the direction of a posture, and still exhibits a sense of incongruity.

Japanese Unexamined Patent Publication No. 2007-295043, incorporated by reference in its entirety herein, is directed to technology that, in the case where a detected obstacle (a human) is present outside the range of a displayed view, illustrates the movement of the obstacle using alternative views based on top views, but the alternative views are suitably limited to the top views acquired from directly above the obstacle. Meanwhile, in the case where an obstacle is present within the range of a displayed screen, the obstacle is displayed as it is. Accordingly, neither of the two cases can overcome the sense of incongruity.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system for suitably displaying views of a vehicle and its surroundings, which is capable of suitably eliminating a sense of incongruity (for example, such as the sense of an obstacle being viewed as having been laid down flat on a road surface) from the display of a conventional combined bird's eye view using a low-cost method, and which is suitably capable of allowing a driver to intuitively and rapidly locate an obstacle outside a vehicle, thus suitably assisting the driver to ensure safety around the vehicle.

In a preferred aspect, the present invention provides a system for displaying views of a vehicle and its surroundings preferably including one or more cameras for suitably photographing a vehicle and its surroundings; obstacle detection means for suitably detecting an obstacle outside the vehicle; a memory unit for previously storing alternative views corresponding to the obstacle; and a view processing unit for suitably creating a bird's eye view from a virtual viewpoint outside the vehicle based on views suitably acquired by the cameras; wherein when the obstacle detection means suitably detects the obstacle, the view processing unit pauses a screen on which the obstacle appears, suitably selects an alternative view corresponding to the paused obstacle, reads the alternative view from the memory unit, suitably changes a direction and inclination of the selected alternative view in line with the virtual viewpoint, and then overlaps the changed alternative view on the bird's eye view.

In a preferred embodiment, the view processing unit suitably measures the size of the paused obstacle, suitably detects whether a motion is present, and then suitably selects a moving image or still image alternative view corresponding to the measured size.

In another preferred embodiment, the memory unit suitably stores a plurality of still image alternative views and/or moving image alternative views of different sizes for the same type of obstacle.

In still another preferred embodiment, the view processing unit, prior to the overlapping of the alternative view, suitably eliminates a view of the obstacle and performs compensation using information about the neighboring pixels of the view of the obstacle.

In yet another preferred embodiment, the view processing unit, after the overlapping of the alternative view, suitably inserts a gradation effect view around the overlapped alternative view, or reads the alternative view, previously associated with the gradation effect view, from the memory unit and then overlaps them.

In still yet another preferred embodiment, the view processing unit, if the size of the obstacle detected by the obstacle detection means is suitably greater than a predetermined value, does not overlap the alternative view.

In a further preferred embodiment, the view processing unit overlaps the alternative view along a rectilinear line that suitably connects the center of the vehicle with the location of the obstacle on a road surface.

In another further preferred embodiment, the memory unit preferably stores a plurality of models for the same type of obstacle depending on distances from the vehicle, the models including models for the cases where part of the obstacle falls within the photographable range of the cameras, and the view processing unit suitably compares a view of the detected obstacle with the models, pauses the obstacle, and then selects an overall alternative view of the obstacle.

Other aspects and preferred embodiments of the invention are discussed infra.

Preferably, according to preferred embodiments of the present invention, a view processing unit suitably transforms views from photographing means into a bird's eye view taken from above a vehicle or from beside a vehicle, selects an alternative view suitable for the size of a 3D obstacle outside the vehicle and the motion of the vehicle from a memory unit based on information from obstacle detection means, and then overwrites the bird's eye view, so that the 3D obstacle located outside the vehicle is suitably displayed without causing a sense of incongruity and a driver can easily locate the obstacle.

The above and other features of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 1A and 1B are block diagrams showing the overall configurations of systems for displaying views of a vehicle and its surroundings according to preferred embodiments of the present invention, wherein FIG. 1A shows a system in which separate obstacle detection means is provided and FIG. 1B shows a system in which a set of photographing means and view processing means include obstacle detection means;

FIGS. 2A and 2B are diagrams showing the locations of virtual viewpoints around a vehicle, wherein FIG. 2A shows the virtual viewpoints viewed from above the vehicle and FIG. 2B shows the virtual viewpoints viewed from beside the vehicle;

FIGS. 3A to 3D are views of a vehicle and an obstacle beside the vehicle viewed from locations corresponding to virtual viewpoints, wherein FIG. 3A is a view from a side viewpoint in the case where the height of the obstacle is relatively low, FIG. 3B is a view from a top viewpoint common to the case where the height of the obstacle is high and the case where the height of the obstacle is low, FIG. 3C is a view from a side viewpoint in the case where the height of the obstacle is high, and FIG. 3D is a view from a back viewpoint in the case where the height of the obstacle is high;

FIGS. 4A to 4D are diagrams illustrating the flow of, in the case where the height of the obstacle is relatively low, transforming a view captured by photographing means (a side camera) into a bird's eye view from a side virtual viewpoint, wherein FIG. 4A is an input view, FIG. 4B is a rotated view, FIG. 4C is a projectively transformed view, and FIG. 4D is an output view;

FIGS. 5A to 5D are diagrams illustrating the flow of, in the case where the height of an obstacle is relatively high, transforming a view captured by photographing means (a side camera) into a bird's eye view from a side virtual viewpoint, wherein FIG. 5A is an input view, FIG. 5B is a rotated view, FIG. 5C is a projectively transformed view, and FIG. 5D is an output view;

FIG. 9 is a diagram showing examples of the alternative view of FIG. 7;

FIGS. 12A to 12D show an example of a top view illustrating the effect of using an alternative view to which the gradation effect has been applied, wherein FIG. 12A shows a conventional view (the angle of which has not been corrected), FIG. 12B shows a view overwritten with an alternative view the angle of which has been corrected, FIG. 12C shows a view using an alternative view to which the gradation effect has been applied, and FIG. 12D is an ideal view;

Figure 1A:
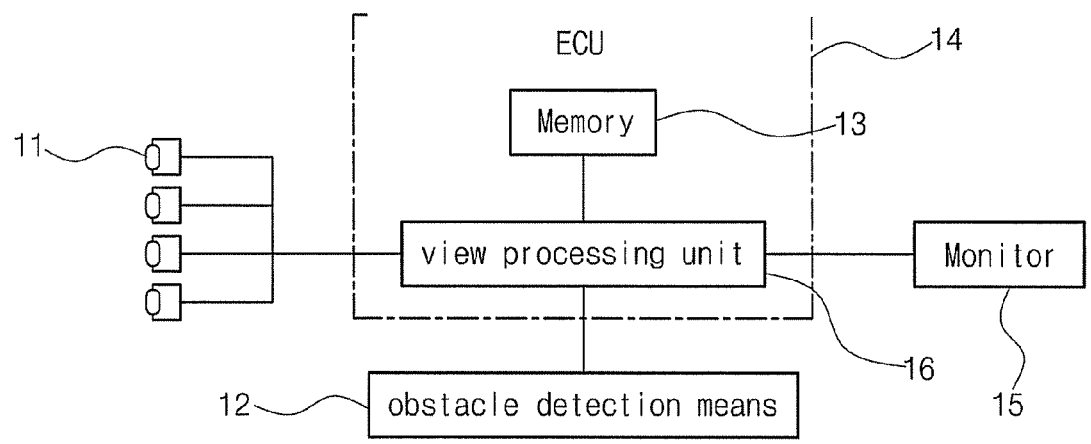

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The present invention provides, in one aspect, a system for displaying views of a vehicle and its surroundings comprising one or more cameras for photographing a vehicle and its surroundings, obstacle detection means for detecting an obstacle outside the vehicle, a memory unit; and a view processing unit.

In one embodiment, the memory unit is used for previously storing alternative views corresponding to the obstacle.

In another embodiment, the view processing unit is used for creating a bird's eye view from a virtual viewpoint outside the vehicle based on views acquired by the cameras.

In a further embodiment, when the obstacle detection means detects the obstacle, the view processing unit pauses the screen on which the obstacle appears, selects an alternative view corresponding to the paused obstacle, reads the alternative view from the memory unit, changes a direction and inclination of the selected alternative view in line with the virtual viewpoint, and then overlaps the changed alternative view on the bird's eye view.

The present invention also features a motor vehicle comprising a system for displaying views of a vehicle and its surroundings of the aspects described herein.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Preferred embodiments of the present invention will be described with reference to the accompanying drawings.

Figure 1B:
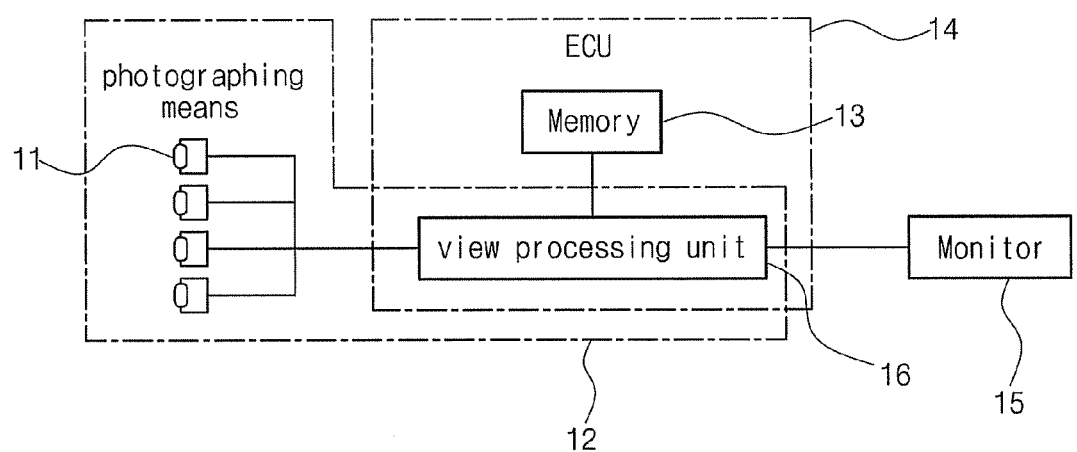

According to certain preferred embodiments of the present invention, and for example as shown in FIGS. 1A and 1B, the system for displaying views of a vehicle and its surroundings preferably includes one or more cameras 11 (e.g., photographing means) for suitably photographing a vehicle and its surroundings, obstacle detection means 12 for suitably detecting an obstacle outside the vehicle, a memory unit 13 for suitably storing the data of alternative views, a view processing unit 16 for suitably creating a view in which views captured by the cameras are transformed into a bird's eye view and an obstacle (a 3D object) in the bird's eye view has been replaced with an alternative view, and a monitor 15 (a display unit) for suitably displaying a view created by the view processing unit 16.

According to certain preferred embodiments, the memory unit 13 and the view processing unit 16 are generally included in an Electronic Control Unit (ECU) 14.

Preferably, the obstacle detection means 12 may be suitably constructed of any one of a laser, a sonar and a radar, as shown in FIG. 1A. Alternatively, the obstacle detection means 12 is preferably included in the photographing means 11 and the view processing unit 16, so that views captured by the photographing means 11 are suitably analyzed by the view processing unit 16 and then an obstacle is detected, for example as shown in FIG. 1B.

According to further preferred embodiments of the present invention, the cameras 11 are generally mounted on mirrors that are suitably disposed on the front right and left and rear right and left sides of a vehicle. In further embodiments, although the monitor 15 may preferably be separately provided in a vehicle, the monitor 15 may be preferably also used as a car navigation monitor, so that the monitor 15 may be automatically transformed into a bird's eye view monitor in the case of stopping or low-speed driving.

Figure 2A:
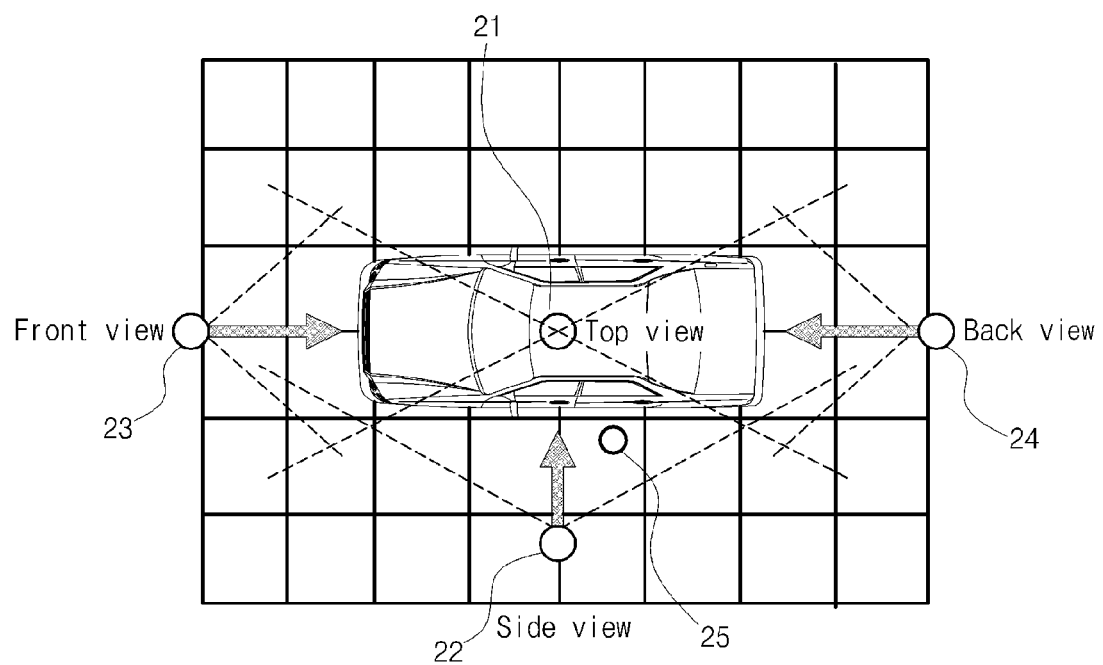
Figure 2B:
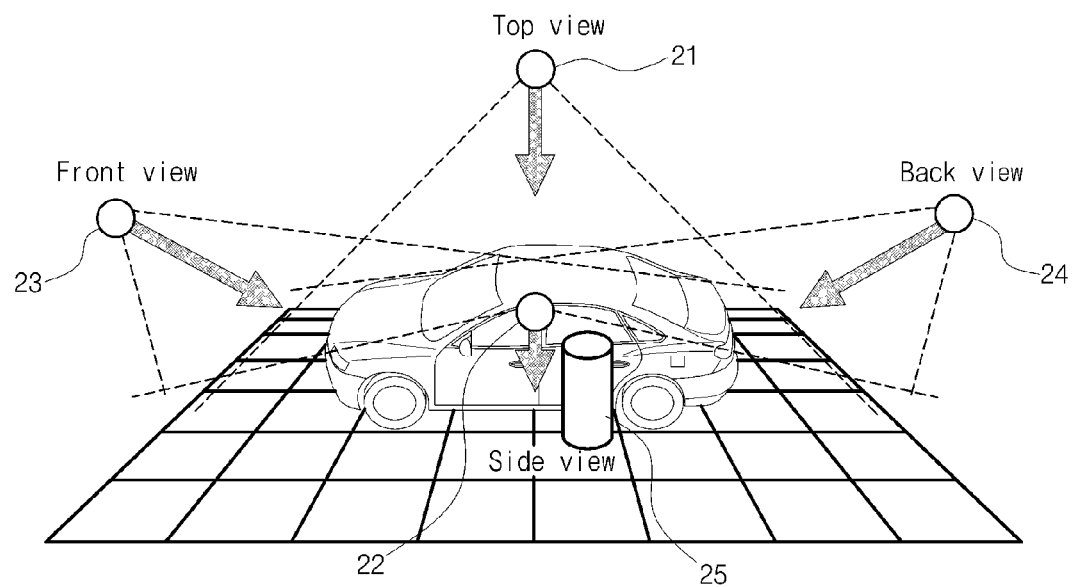

In other preferred embodiments, for example as shown in FIGS. 2A and 2B, virtual viewpoints that are preferably considered when a bird's eye view of a vehicle 20 and its surroundings are suitably created may be virtual viewpoints 21, 22, 23 and 24 above the vehicle 20, on a side of the vehicle 20, in front of the vehicle 20 and behind the vehicle 20, and these viewpoints may be suitably referred to as top, side, front and back viewpoints, respectively.

Figure 3A:
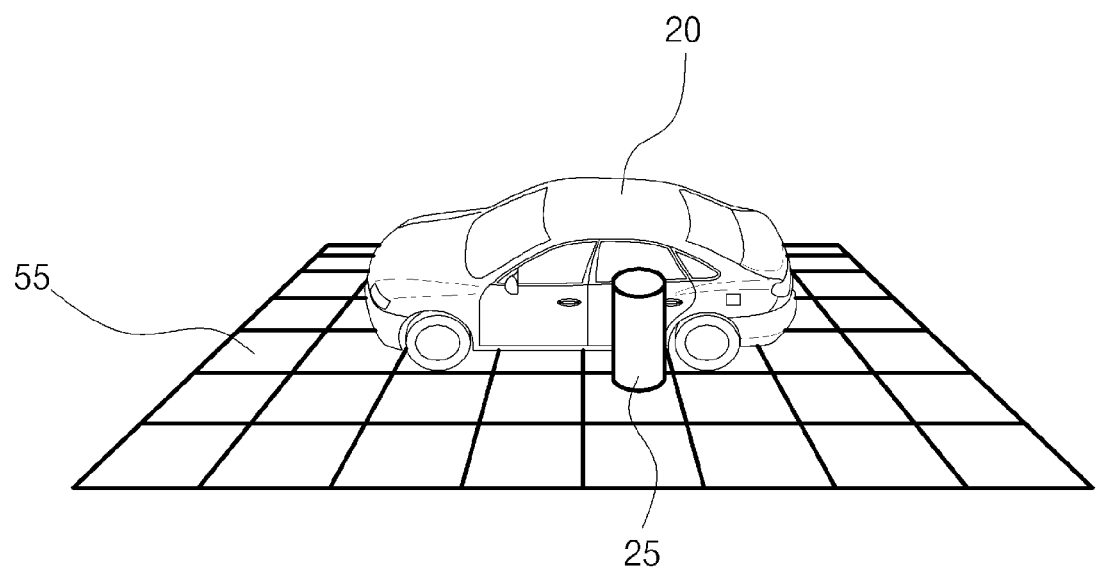
Figure 3B:
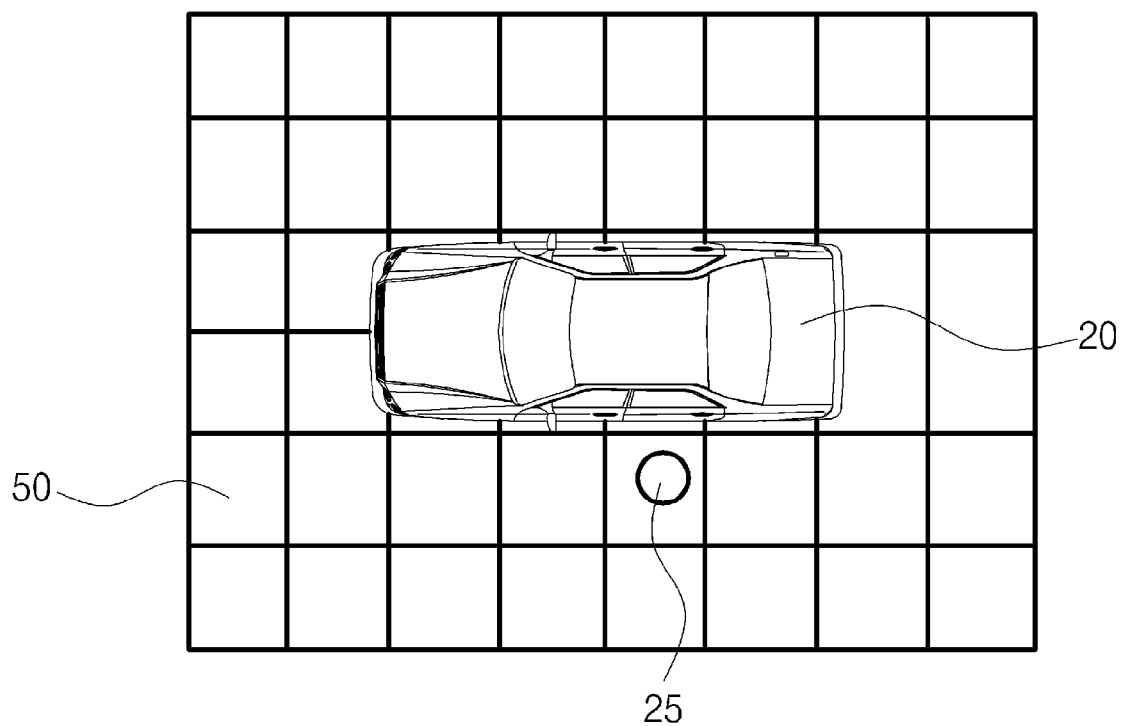

Accordingly, in practice, for example, in the case where the vehicle 20 and the obstacle 25 standing beside the vehicle 20 are preferably viewed from locations corresponding to the side and top viewpoints, when the height of the obstacle is relatively low, views must suitably correspond to the views of FIGS. 3A and 3B, respectively, relative to road surface views 55 and 50.

Figure 3C:
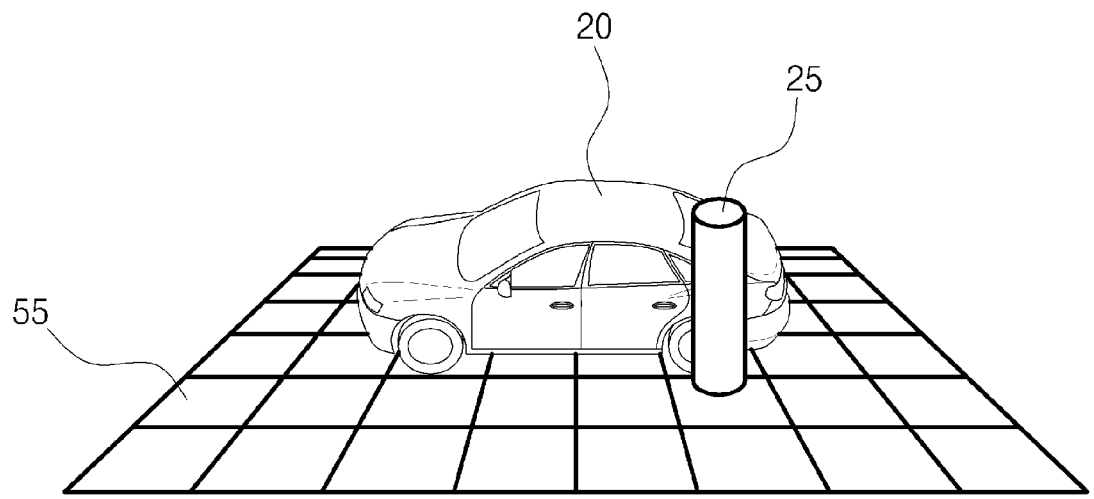
Figure 3D:
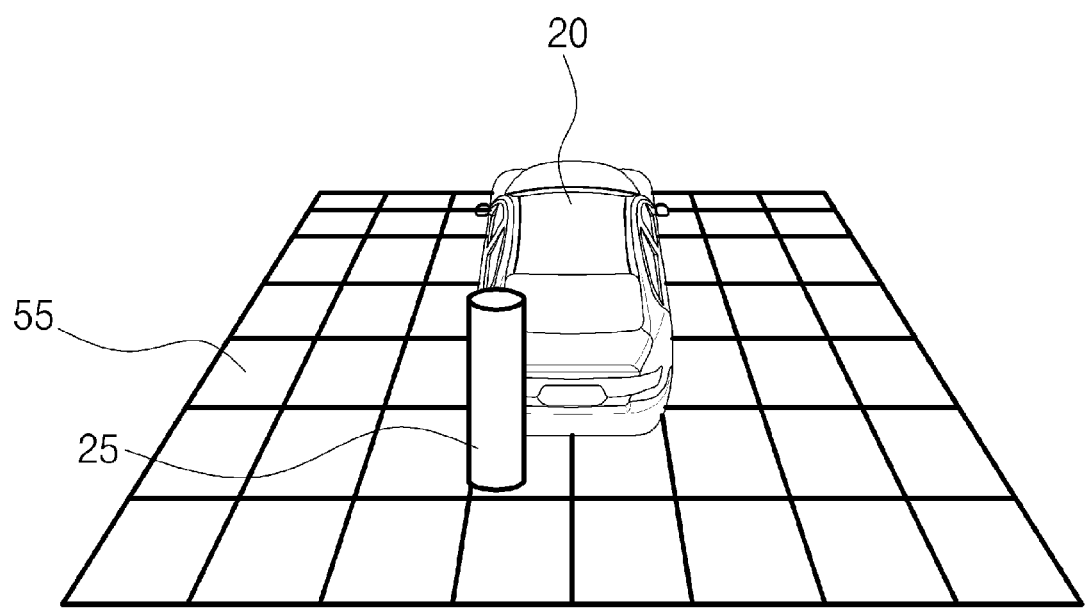

Further, in other preferred embodiments, when the height of the obstacle is relatively high, the above views must suitably correspond to the views of FIGS. 3C and 3D, respectively, relative to the road surface views 55 and 50.

In other preferred embodiments of the invention, for example, in the case where a view captured by a camera 11 mounted on a side door mirror is suitably processed and a bird's eye view from a side viewpoint is created, when the height of the obstacle is relatively low, there occurs the sense of incongruity in which the obstacle 25 which must stand while showing its back surface is generally viewed as having been turned upside down while showing its front surface, or is generally viewed as having been completely laid down flat, that is, as having fallen over, as in an output view shown in FIG. 4D.

According to still other embodiments of the invention, and in the following description, the front and back surfaces of the obstacle 25 refer to the surface of the obstacle 25 facing the vehicle 20 (that is, the camera 11 mounted on the side door mirror) and its opposite surface, respectively.

Preferably, in the case where the height of the obstacle 25 is relatively high as shown in FIGS. 5A to 5D, the upper part of the obstacle does suitably fall within the photographable range of the camera, so that there arises the sense of incongruity in which the obstacle 25 which must stand while showing its back surface is generally viewed as having been suitably turned upside down while showing its front surface, or is generally viewed as having been completely laid down flat, that is, as having fallen over, or in which only the lower part of the obstacle 28 is suitably viewed, as in an output view shown in FIG. 5D, thereby suitably provoking a driver's misjudgment.

According to certain exemplary embodiments, the cause of the phenomenon will now be described with reference to the flow of the creation of a bird's eye view, shown in FIGS. 4A to 4D, for a preferred example where the height of an obstacle is relatively low.

FIG. 4A shows an input view which is captured by a camera mounted on a side door mirror according to certain exemplary embodiments of the present invention.

In some exemplary embodiments, FIG. 4B shows "a view from a camera side" that is preferably considered to be "a view from a side viewpoint," so that the view has been suitably rotated by 180 degrees, and the upper side of the view is preferably a vehicle side and the lower side of the view is preferably a side viewpoint side. Preferably, the obstacle 26 is viewed as having been suitably turned upside down.

In some exemplary embodiments, for example as shown in FIG. 4C, in order to make the perspective of the rotated view of FIG. 4B natural, the vehicle side (the upper side of the view) has been suitably reduced and the side outside the vehicle (the lower side) has been suitably extended using a projective transformation. Preferably, the obstacle 27 is greatly deformed, so that the sense of incongruity is further suitably increased.

In some exemplary embodiments, for example as shown in FIG. 4D, a view from a side viewpoint has been completed by suitably combining the projectively transformed view of FIG. 4C with an alternative view of the vehicle. Preferably, the obstacle 28 is viewed as having been turned upside down (or as having been completely laid down flat), so that the shape of the obstacle 28 is greatly deformed, with the result that the sense of incongruity is suitably serious and a driver's misjudgment may be caused.

According to further preferred embodiments of the present invention, the cause of the phenomenon for the case where the height of an obstacle is relatively high can preferably be understood in the same way based on the flow of creating a bird's eye view shown in FIGS. 5A to 5D. Preferably, in this case, only the lower part of the obstacle 25 can be suitably photographed but the upper part thereof cannot be suitably photographed, so that the lower part 28 of the obstacle 25 which has been turned upside down and deformed is shown in FIG. 5D, which is the bird's eye view which is output.

In further embodiments, the same problem occurs in the case where a bird's eye view from a top viewpoint is created using views from four cameras.

Figure 6:
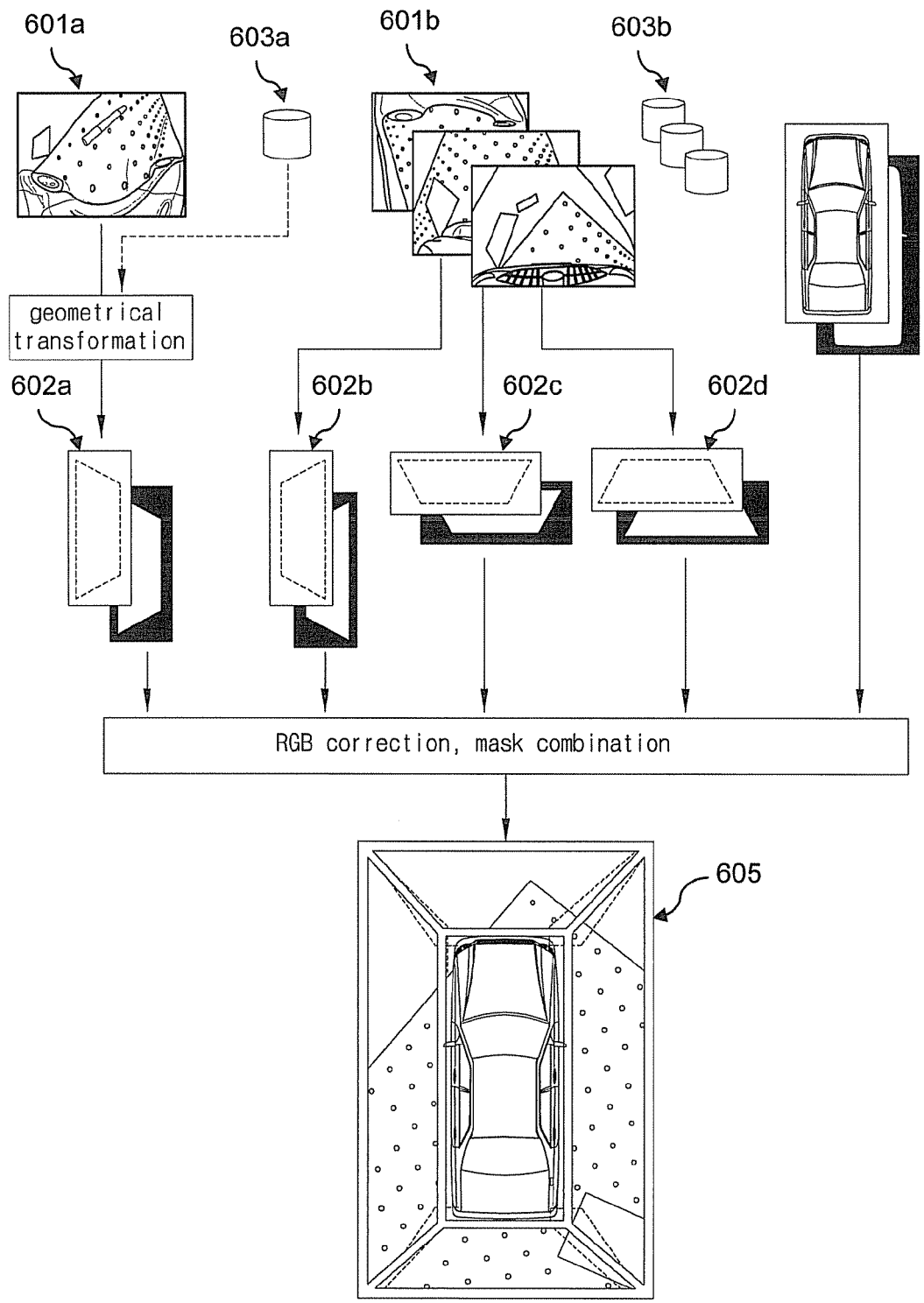
FIG. 6 is a diagram illustrating the flow of transforming views captured by photographing means (four front, rear, right and left side cameras) into a bird's eye view from a top virtual viewpoint.

In some exemplary embodiments, for example as shown in FIG. 6, the general sequence of creating a bird's eye view is illustrated.

Preferably, respective original views 601a-b captured by four cameras 603a-b are suitably geometrically transformed into rectangular views based on respective sides of a vehicle on which the cameras have been suitably mounted, necessary view information is cut out using respective trapezoidal masks, trapezoidal views 602a-d are suitably attached to the four peripheries of the alternative view of the vehicle, and smoothing is performed on the overlapping portions of the trapezoidal views, thereby creating a bird's eye view 605 from a top viewpoint.

Accordingly, in further preferred embodiments, the above-described rotation by 180 degrees is not necessary, so that the obstacle 25 is neither suitably reversed nor suitably inverted. However, according to related embodiments, the deformation phenomenon of having been completely laid down flat occurs as well, and the sense of incongruity felt by a driver is suitably serious.

Figure 7:
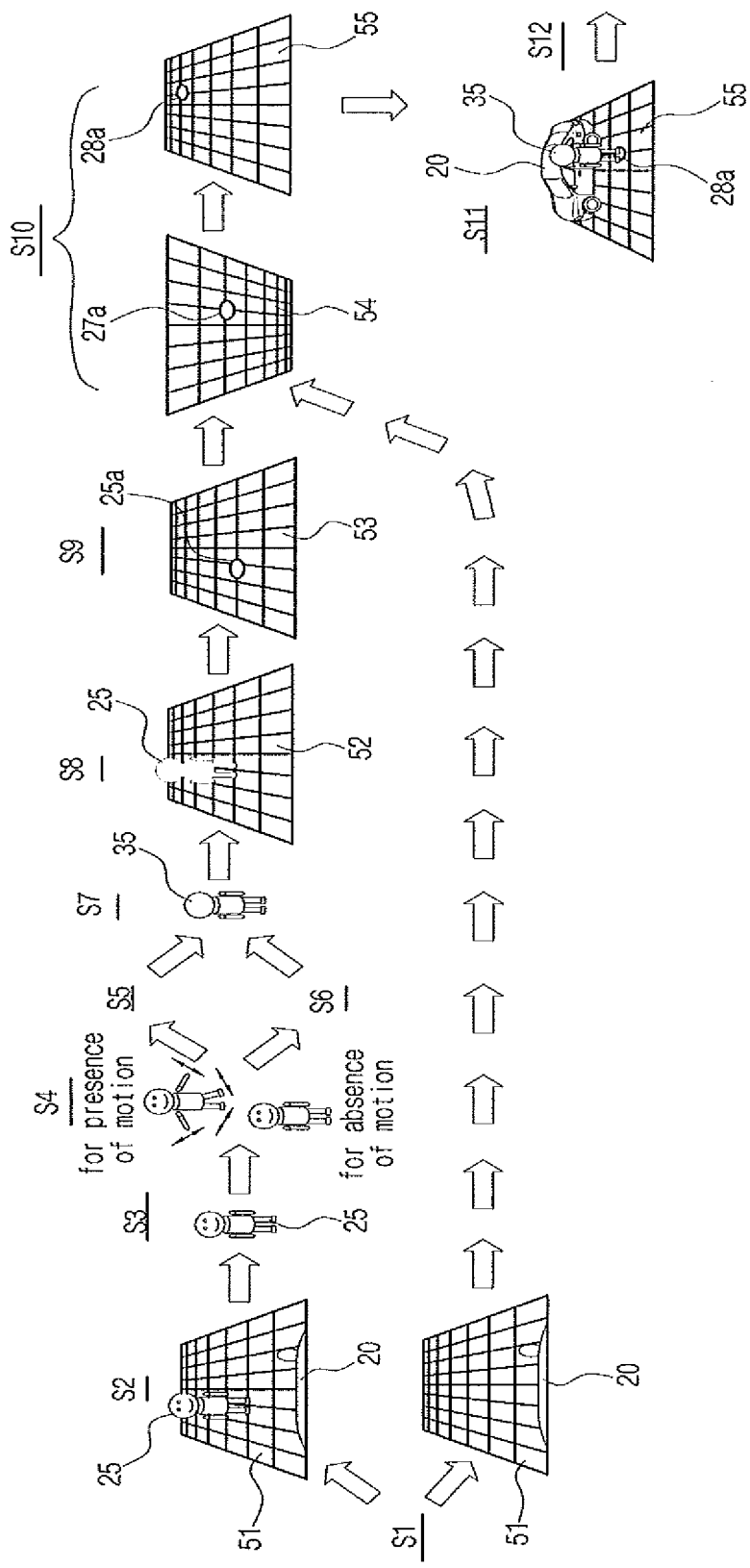
FIG. 7 is a diagram illustrating the flow of, when a view captured by a side camera is transformed into a bird's eye view from a side virtual viewpoint, replacing a view of an obstacle with an alternative view according to the present invention.
Figure 8:
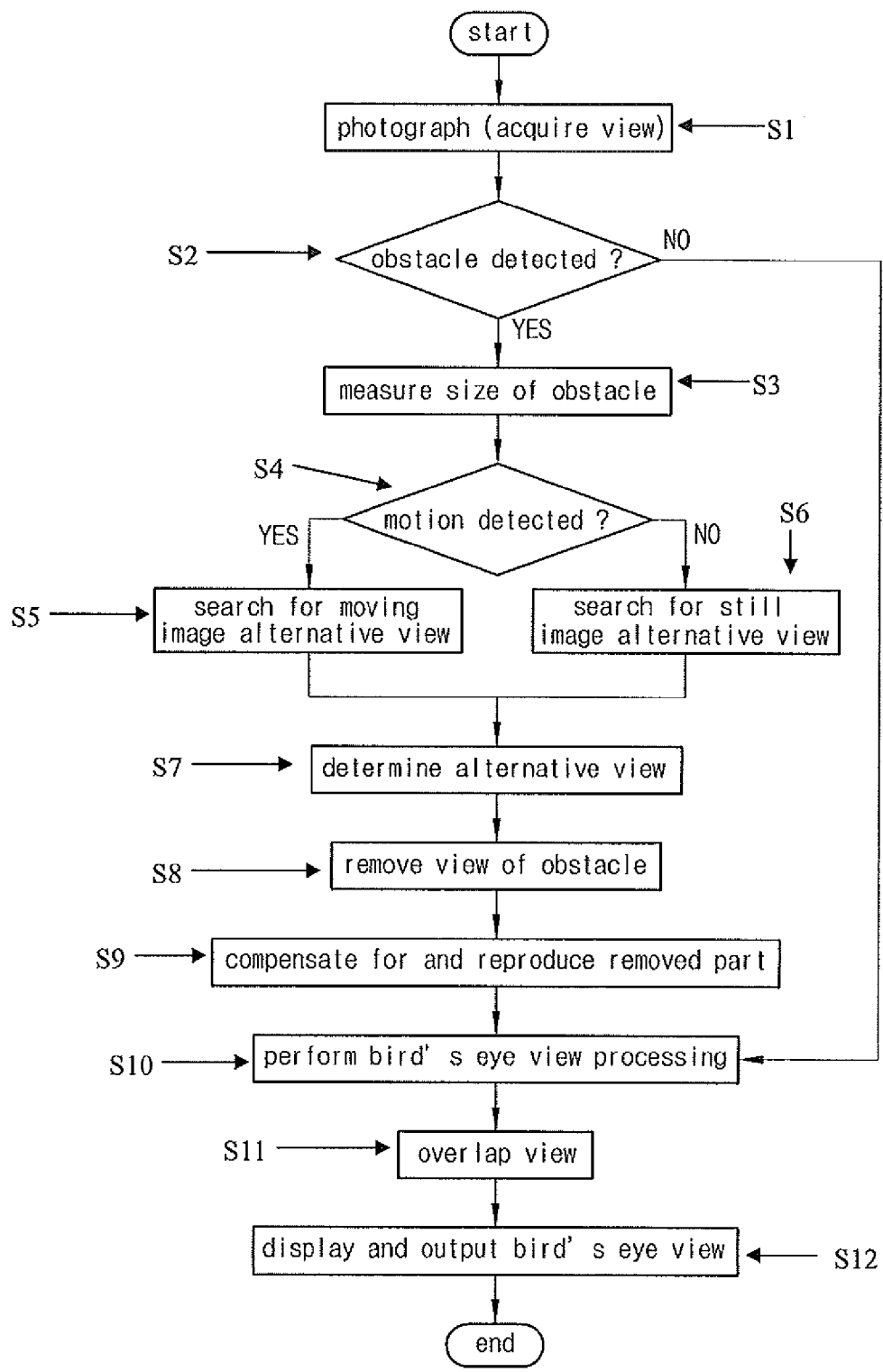
FIG. 8 is a flowchart of the view processing of FIG. 7.

Next, according to further embodiments of the invention as described herein, a sequence capable of overcoming the deformation phenomenon of the obstacle being viewed as having been laid down flat according to the present invention is described in the sequence of steps S1 to S12 with reference to FIG. 7 illustrating the flow of view processing and FIG. 8 showing a flowchart corresponding to FIG. 7.

In certain preferred embodiments and referring to FIGS. 7 and 8, at step S1, for example, the camera 11 that is suitably mounted on a side door mirror preferably captures a view of a vehicle and its surroundings.

In further preferred embodiments, at step S2, the obstacle detection means 12 detects whether an obstacle is suitably present outside the vehicle. Preferably, with regard to step S2 of FIG. 7, upper and lower views suitably correspond to the presence and absence of the obstacle 25, respectively.

In further preferred embodiments, in the case where the obstacle detection means 12 is suitably constructed of the photographing means 11 and the view processing unit 16 as shown in FIG. 1B, the obstacle detection means 12 suitably analyzes the captured camera view and then detects the obstacle 25.

According to other preferred embodiments of the invention, in the case where the obstacle detection means 12 is preferably separately provided as shown in FIG. 1A, for example, in the case where the obstacle detection means 12 is preferably a radar, the obstacle 25 is detected using said means.

Preferably, if an obstacle is not detected at step S2, the process suitably proceeds directly to step S10, described herein.

According to further preferred embodiments of the present invention, at step S3, the size of the obstacle is suitably measured, and at step S4, whether the motion of the obstacle is present is suitably detected. For example, in certain embodiments, in the ease where the obstacle detection means 12 is preferably a radar, the measurement of the size of the obstacle and the detection of the presence of the motion of the obstacle are preferably performed by scanning the area for the obstacle using the radar.

Preferably, in the case where the obstacle detection means 12 is suitably constructed of the photographing means 11 and the view processing unit 16, as shown in FIG. 1B, for example, the application of the motion stereo principle to camera views may preferably be considered. Accordingly, by using this principle, suitably capturing the views, suitably measuring the distance to the obstacle, suitably recognizing the shape of the obstacle, and suitably determining the motion of the obstacle can be performed.

Figure 14A:
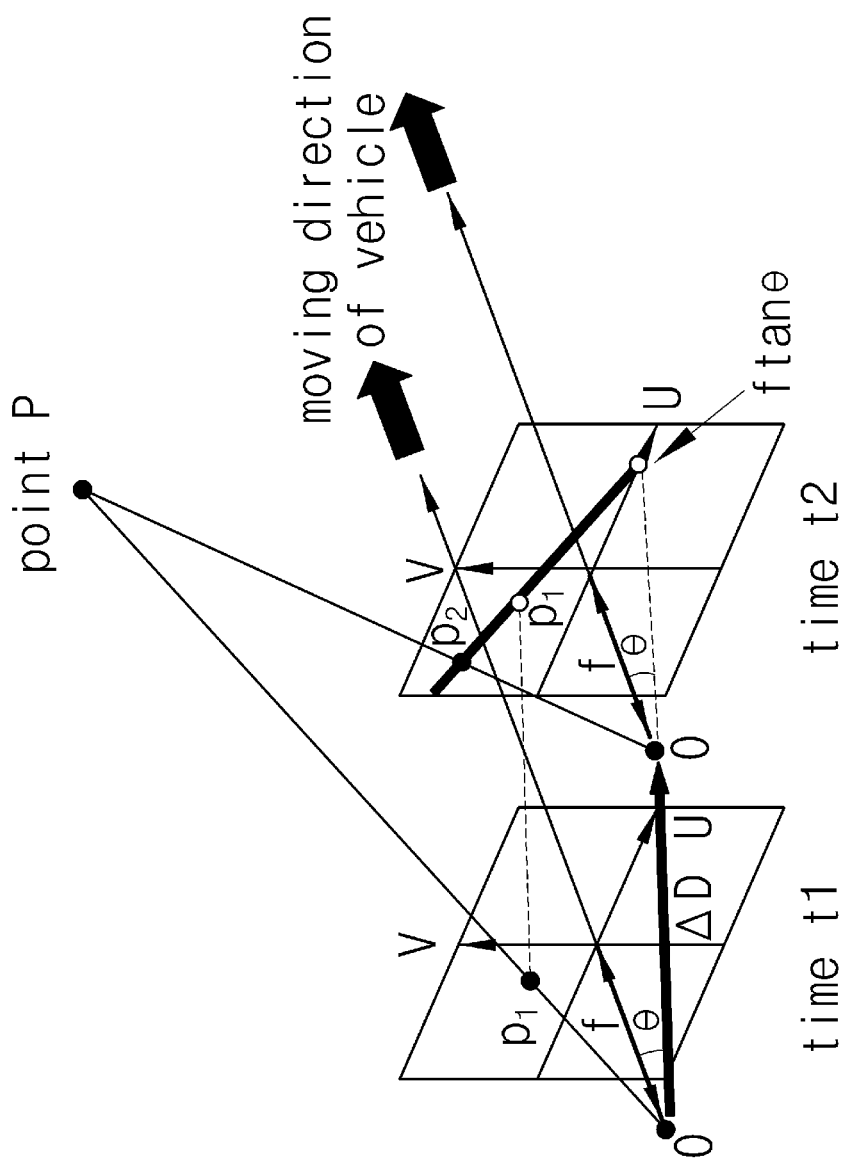
FIG. 14 is a diagram illustrating the monoscopic ranging principle based on the motion stereo method.
Figure 14B:
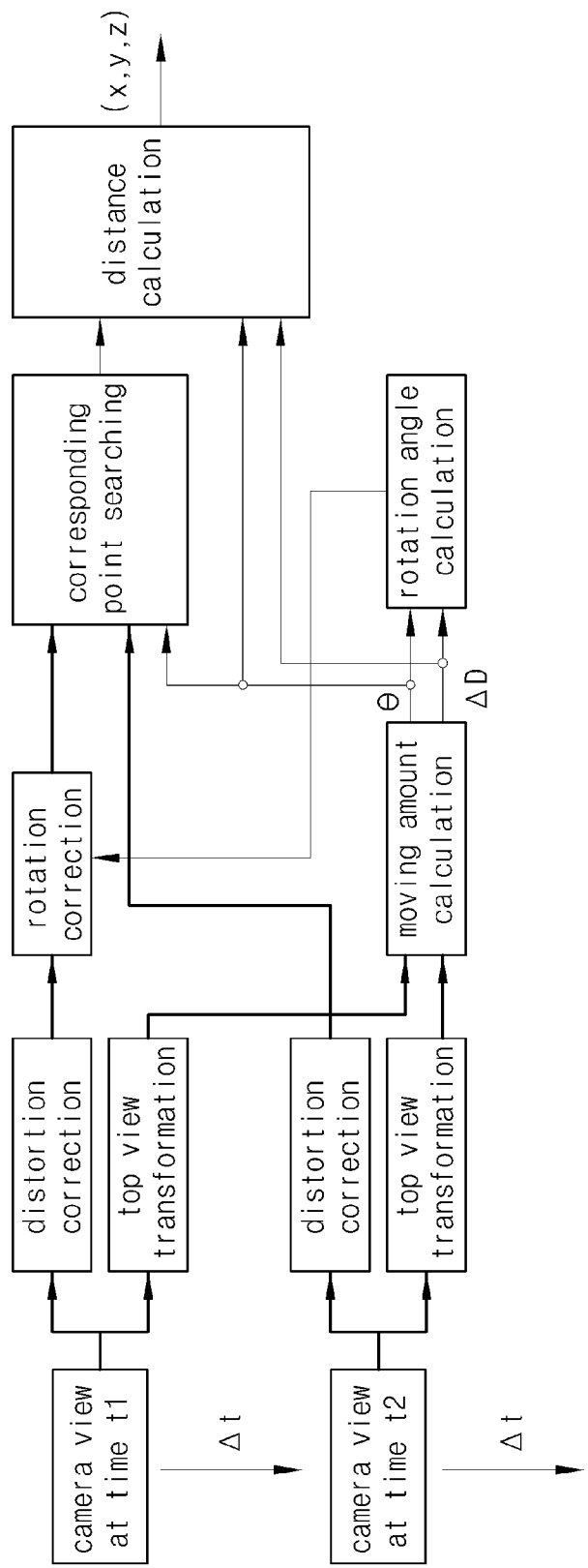

In certain exemplary embodiments, for example, referring to FIG. 14, the motion stereo method is preferably used to estimate the distance to an obstacle and the shape of the obstacle based on view data acquired at time t and view data acquired at time t+Δt.

In certain preferred embodiments of the present invention, if the obstacle is determined to be moving, moving image alternative views stored in the memory unit 13 are suitably searched for at step S5, and an alternative view 35 corresponding to the measured size is preferably selected from among the retrieved views at step S7.

Furthermore, if the obstacle is suitably determined to remain stationary (for example, a standing human) at step S4, still image alternative views stored in the memory unit 13 are suitably searched for at step S6, and an alternative view 35 corresponding to the measured size is preferably selected from among the retrieved views at step S7.

Accordingly, by doing so, a moving image or still image alternative view is suitably determined at step S7.

According to further preferred embodiments of the present invention, the alternative view 35 is suitably adjusted such that the direction and inclination of the alternative view 35 are preferably set for a side viewpoint (a viewpoint in the case where the vehicle is viewed from above in the lateral direction), which is the viewpoint of the bird's eye view in the present embodiment.

Accordingly, in certain embodiments, the direction is suitably set for the rear surface of the obstacle (for example, a standing human), and the inclination is suitably set for a vertical state (90 degrees). In other certain embodiments, if the obstacle, such as a pole, is suitably determined to be inclined, the inclination is set to the angle of inclination.

According to preferred embodiments of the present invention, the "direction and inclination" may be suitably calculated whenever necessary, or an optimal view may be preferably selected from among corresponding alternative views stored in the memory unit.

In further preferred embodiments, in the motion stereo principle in which the measurement of the distance to an obstacle, shape recognition and the determination of the presence of a motion are suitably performed based on camera views, if an obstacle having a height outside the photographable range of the cameras 11 is suitably present, it may be difficult to accurately determine the characteristics of the obstacle and to suitably select an appropriate alternative view from the memory unit.

Figure 11B:
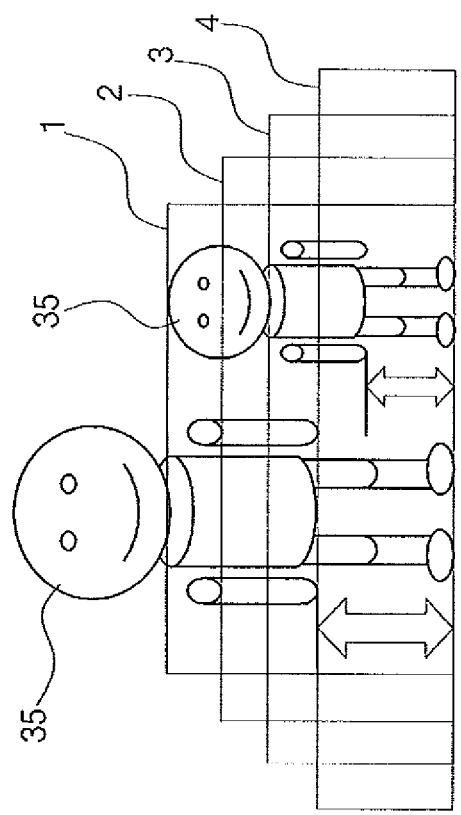
FIGS. 11A and 11B are diagrams showing a range within which obstacles can be photographed depending on the distance to a vehicle and examples of the selection of an alternative view, respectively.
Figure 11A:
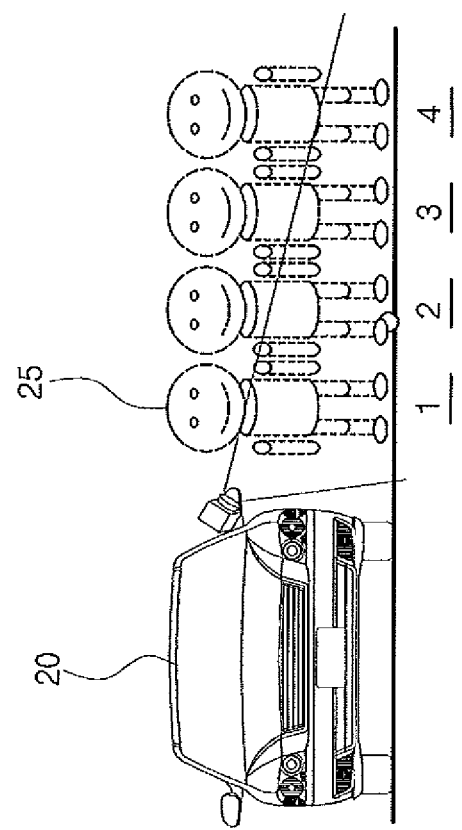

For example, according to certain exemplary embodiments and as shown in FIG. 11A, the photographable range of the camera 11 generally extends from the location of a side door mirror to a remote location on a road surface.

In further preferred embodiments, for example in the case where an obstacle is suitably located close to a vehicle and the height of the obstacle is higher than that of a side door mirror as described above, or in the case where a tall obstacle approaches a vehicle, part of the obstacle 25 is suitably outside the photographable range of the camera, so that it may be impossible to suitably accurately measure the size of the obstacle.

Preferably, a case where an alternative view is suitably changed on the way, such as the case where an object approaches a location near a vehicle from a remote location, may be considered.

In related embodiment, and in order to deal with this case, the system for displaying views of a vehicle and its surroundings according to the present invention suitably prepares various types of models, including a model for representing part of an obstacle, for the same type of obstacle, depending on the height of the obstacle 25 (human) (an adult and a child) and the distance to a vehicle, for example as shown in FIG. 11B.

Preferably, by classifying acquired views of obstacles into several models and arranging them, it is possible to suitably assign an appropriate alternative view 35 of the overall obstacle including a part outside the photographable range of the camera even to an obstacle having a part outside the photographable range of the camera.

According to preferred exemplary embodiments of the present invention, for example as shown in FIG. 11A, in the case of an adult obstacle 25, four stage models (1. a model below the neck, 2. a model below the chest, 3. a model below the waist, and 4. a model below the knee) are suitably provided as captured shape recognition models depending on the distance to a vehicle, and an alternative view for the overall adult acquired by compensating for the part outside the photographable range is provided, as shown in FIG. 11B.

In preferred embodiments of the invention, for a child, a similar sequence is suitably adopted.

Preferably, if an obstacle detected by the obstacle detection means is suitably determined to encompass a predetermined portion of a vehicle, a wall or the like, for example, 50% or more of any one of the front, rear, right and left photographable ranges outside a vehicle, the following view processing is not performed, but the display of the phenomenon is suitably maintained.

According to other preferred embodiments of the present invention, at step S8, a road surface view 52 is suitably acquired by eliminating the pixels of the obstacle 25 (a view that has been determined to be a view of the obstacle 25) detected at step S2 from a view, including the obstacle 25 and the road surface view 51, that are suitably acquired by the camera 11 at step S1.

Preferably, at step S9, in order to remove a sense of incongruity from the road surface view 52, a road surface view 53 is suitably created by performing compensation, reproduction and overwriting based on the chromatic information of the pixels of a surrounding road surface part.

Preferably, pixel compensation technology, such as, but not limited to, nearest neighbor interpolation, is suitably applied to the supplementation and the reproduction.

Furthermore, traffic signs, such as lane lines drawn on a road surface, are suitably determined not to be obstacles, and are considered to constitute part of a road surface view.

In further preferred embodiments, according to the present invention, at step S7, the sense of incongruity of the road surface view can be suitably reduced by adding a view having a gradation effect close to pixel compensation to the alternative view 35 itself.

In other preferred embodiments, although the gradation effect view may be suitably added whenever necessary at step S7, a corresponding gradation effect view may be suitably stored in the memory unit in association with each alternative view in the form of a set of the gradation effect view and the alternative view.

Figure 13:
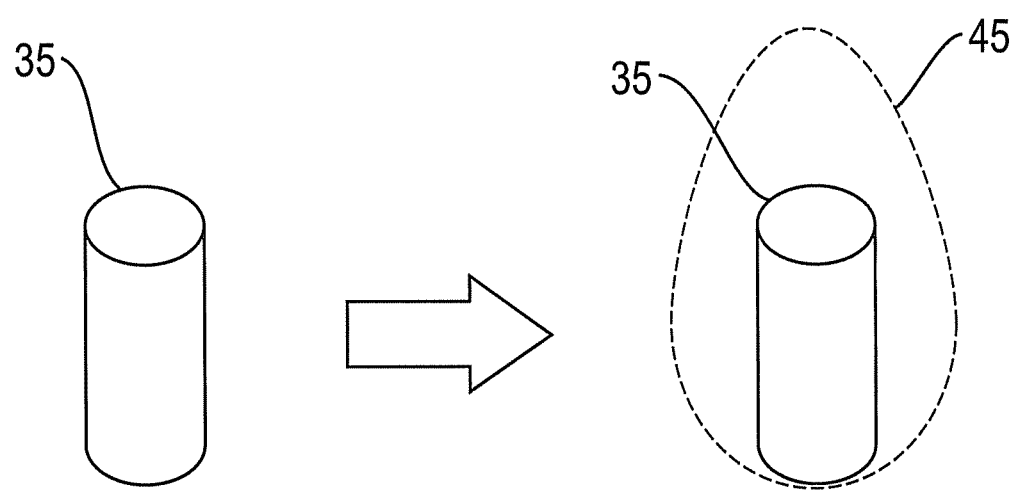
FIG. 13 is a diagram illustrating an alternative view to which the gradation effect has been applied.

For example, in certain exemplary embodiments and referring to FIG. 13, the gradation effect view 45 is preferably added to the alternative view 35, thus suitably forming an alternative view.

The gradation effect view 45 has a simple contour composed of smooth closed curves, such as a circle and an ellipse, and a single color in gray scale, and hides a deformed obstacle view resulting from an original obstacle view.

In related embodiments, step S8 (the elimination of the pixels of the obstacle) and step S9 (the interpolating reproduction of the pixels of a road surface) may preferably be omitted, and the sense of incongruity of the road surface view can be suitably reduced at low cost.

Alternatively, in other preferred embodiments of the invention, step S9 may be omitted and only step S8 may preferably be performed, and in other preferred embodiments, both steps S8 and S9 may be suitably performed without omission.

Preferably, in further embodiments of the present invention, at step S10, bird's eye view processing is suitably performed. Preferably, the road surface view 54 is suitably obtained by rotating the road surface view 53 by 180 degrees so that the vehicle 20 is preferably located in the upper part of a screen, and then the road surface view 55 is suitably created by performing a projective transformation on the road surface view 54 so that the road surface view 54 has a natural perspective in such a manner that a front side is close and a vehicle side is remote.

Preferably, after the view of the obstacle 25 has been suitably eliminated at step S8, the locations 26a, 27a and 28a of the obstacle on the road surface are preferably preserved through steps S9 and S10.

Preferably, at step S11, view overlapping is performed. According to certain preferred embodiments, an alternative view of the vehicle 20 viewed from a virtual viewpoint is suitably combined with the road surface view 55 created at step S10.

Accordingly, if the obstacle 25 has been suitably detected at step 2, a bird's eye view in which the vehicle and the obstacle have been viewed from a virtual viewpoint is completed by further overlapping the alternative view 35 of the obstacle 25 determined at step S7, on the view obtained by combining the alternative view (which is also denoted by reference numeral 20) of the vehicle 20 and the road surface view 55 together. At step S12, the complete bird's eye view is output by displaying it on the monitor 15.

Preferably, the alternative view 35 of the obstacle is suitably lined up with the location 28 of the road surface view 55 on a road surface and is then combined in an overwriting manner.

The features and advantages of a system for displaying views of a vehicle and its surroundings according to preferred embodiments of the present invention have been described in the sequence of FIGS. 7 and 8 with reference to the case where a bird's eye view from the virtual viewpoint 22 beside the vehicle (a side viewpoint) is suitably created using a side door mirror camera, as shown in FIG. 2.

Preferably, the sequence of FIGS. 7 and 8 according to the present invention may be suitably applied to both the creation of a bird's eye view from the virtual viewpoint 23 in front of the vehicle (the front viewpoint) in FIG. 2 and the creation of a bird's eye view from the virtual viewpoint 24 behind the vehicle (the back viewpoint) in FIG. 2 in the completely same manner.

According to further preferred embodiments, in the case of a bird's eye view from the virtual viewpoint 21 above the center of the vehicle (the top viewpoint) in FIG. 2, the sequence of FIGS. 7 and 8 may be suitably applied to each of the views captured by four cameras respectively mounted on the front right, front left, rear right and rear left sides of the vehicle, as shown in FIG. 6.

According to further embodiments, in this case, at step S9, 180-degree rotation is not necessary, and the road surface view 53 is immediately and projectively transformed to the road surface view 55.

Preferably, in the case of the bird's eye view from the top viewpoint 21, if a view taken from immediately above is preferably used as the alternative view 35 of the obstacle, it is difficult to suitably determine whether the obstacle is, for example, a human or a pole.

Figure 10B:
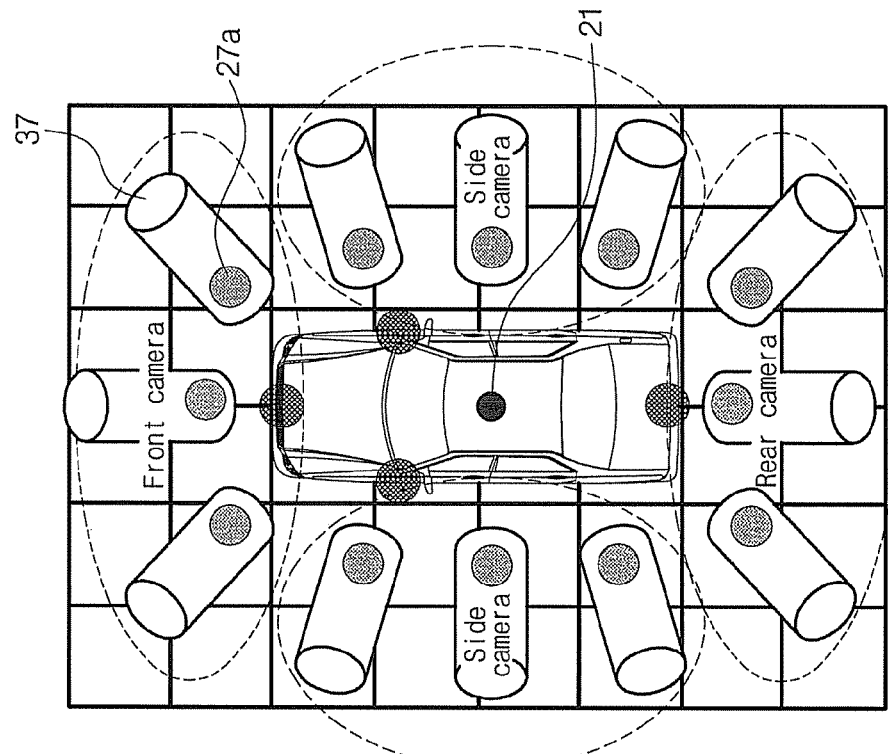
FIGS. 10A and 10B are drawings showing a comparison in the top view between an example using an alternative view which is viewed from the point of view of inclination and an example using an alternative view the angle of which has been corrected.
Figure 10A:
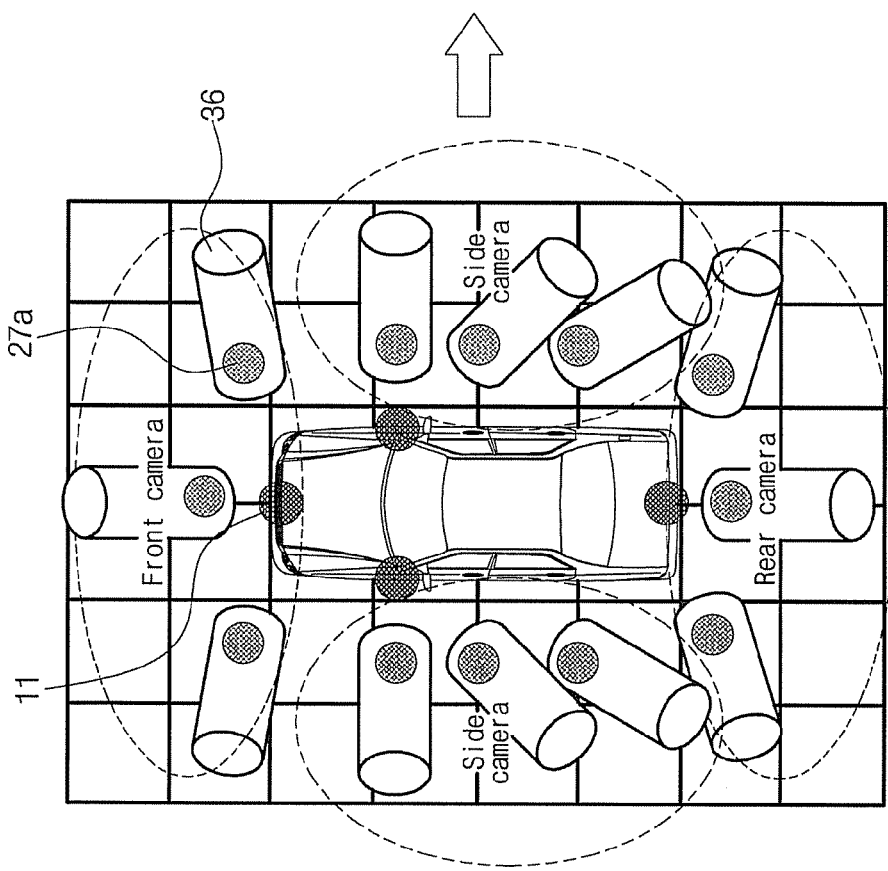

In certain preferred embodiments, for example referring to FIG. 10A, and back to the view of the obstacle 25 in the original camera view, for example, in the case of the obstacle 25 in a bird's eye view based on the view of the front camera 11, the alternative view 36 viewed from the point of view of inclination is suitably displayed in the direction that connects the front camera 11 with the location 27a of the obstacle on a road surface.

Preferably, in the case of FIG. 10A, the alternative view 36 suitably exhibits the sense of incongruity of being viewed as having been completely laid down flat.

Preferably, referring also to FIG. 10B, the direction and inclination of the alternative view 37 are suitably set for the top viewpoint 21 (for example, a viewpoint above the center of the vehicle), which is the viewpoint of the bird's eye view in the present embodiment. Preferably, the direction is suitably set for the front view of the obstacle (for example, a standing human), and the inclination is suitably set for the direction that connects the center of the vehicle (the top viewpoint 21) with the location 27a of the obstacle on a road surface. In other preferred embodiments, in the alternative view 37, the sense of incongruity of being viewed as having been completely laid down flat has been suitably eliminated.

According to other preferred embodiments of the invention and as shown in FIG. 12, FIGS. 12A to 12D show an example of a top view illustrating the effect of using an alternative view to which the gradation effect has been suitably applied.

Preferably, the view of FIG. 12A is a bird's eye view that is suitably acquired by using the sequence shown in FIG. 6. Preferably, in a bird's eye view based on a view from a front camera 11, a view of an obstacle 25b is considerably large in the direction that connects the front camera 11 with the location 27a of the obstacle 25b on a road surface, and the obstacle 25b is viewed as having been completely laid down flat on the road surface.

According to certain exemplary embodiments, FIG. 12B shows a view overwritten with an alternative view 37 in inclined form which has been suitably tilted in the direction that connects the center 21 of the vehicle with the location 27a of the obstacle on a road surface.

Preferably, although the alternative view 37 itself has no sense of incongruity, a considerable part of the view of the obstacle 25b is not suitably hidden by the alternative view 37 but is suitably exposed by the alternative view 37, thus resulting in confusion and a sense of incongruity.

Suitably, and as shown in FIG. 12C, a case where the gradation effect view 45 for the alternative view 35, such as that shown in FIG. 13, has been suitably applied to the alternative view 37. In this example, the view of the obstacle 25b can be actually hidden, the resulting view can suitably compare with an ideal view shown in FIG. 12D, and the sense of incongruity can preferably be practically reduced.

According to certain embodiments, although the view of FIG. 4C can be obtained at low cost, it is substantially equivalent to the view of FIG. 4D from the viewpoint of alerting a driver.

Examples of alternative views stored in the memory unit are shown in FIG. 9.

Preferably, in the case where an alternative view is suitably represented in a bird's eye view in the form of a moving image alternative view and an obstacle is an animal or a human, still image alternative views showing the alternate motions of both hands or both legs may be alternately displayed, thus creating the impression of walking.

In further preferred embodiments, among the alternative views preferably stored in the memory unit are, for example, but not limited to, still image alternative views including a pole, a vending machine, a bench, etc.

Preferably, the obstacle detection means may be any device as long as it can suitably detect the distance from a vehicle to an obstacle, the size of an obstacle, and whether a motion is present. Although a device based on the motion stereo principle in which the distance to an obstacle is suitably measured using a camera based on a view is preferable in terms of cost because it can be also used as view acquisition means as described above, the obstacle detection means may be a laser or an ultrasonic sensor, although is not only limited as such.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for displaying views of a vehicle and its surroundings comprising:

one or more cameras for photographing a vehicle and its surroundings;

obstacle detection means for detecting an obstacle outside the vehicle;

a memory unit for storing alternative views corresponding to the obstacle; and a view processing unit for creating a bird's eye view from a virtual viewpoint outside the vehicle based on views acquired by the cameras;

wherein when the obstacle detection means detects the obstacle, the view processing unit pauses a screen on which the obstacle appears, selects an alternative view corresponding to the paused obstacle, reads the alternative view from the memory unit, changes a direction and inclination of the selected alternative view in line with the virtual viewpoint, and then overlaps the changed alternative view on the bird's eye view.

2. The system of claim 1, wherein the view processing unit measures a size of the paused obstacle, detects whether a motion of the paused obstacle is present, and then selects a moving image or still image alternative view corresponding to the measured size.

3. The system of claim 1, wherein the memory unit stores a plurality of still image alternative views and/or moving image alternative views of different sizes for a same type of obstacle.

4. The system of claim 1, wherein the view processing unit, prior to the overlapping of the alternative view, eliminates a view of the obstacle and performs compensation using information about neighboring pixels of the view of the obstacle.

5. The system of claim 1, wherein the view processing unit, after the overlapping of the alternative view, inserts a gradation effect view around the overlapped alternative view.

6. The system of claim 1, wherein the view processing unit, if the size of the obstacle detected by the obstacle detection means is greater than a predetermined value, does not overlap the alternative view.

7. The system of claim 1, wherein the view processing unit overlaps the alternative view along a rectilinear line that connects a center of the vehicle with a location of the obstacle on a road surface.

8. The system of claim 1, wherein the memory unit stores a plurality of models for a same type of obstacle depending on distances from the vehicle, the models including models for cases where part of the obstacle falls within a photographable range of the cameras, and the view processing unit compares a view of the detected obstacle with the models, pauses the obstacle, and then selects an overall alternative view of the obstacle.

9. The system of claim 1, wherein the view processing unit, before the overlapping of the alternative view, reads the alternative view from the memory unit, wherein the alternative view is previously associated with a gradation effect view.

10. A system for displaying views of a vehicle and its surroundings comprising:

one or more cameras configured to photograph a vehicle and its surroundings;

obstacle detection means configured to detect an obstacle outside the vehicle;

a memory unit; and a view processing unit, wherein when the obstacle detection means detects the obstacle, the view processing unit pauses the obstacle on a screen, selects an alternative view corresponding to the paused obstacle, reads the alternative view from the memory unit, changes a direction and inclination of the selected alternative view in line with a virtual viewpoint, and then overlaps the changed alternative view on a bird's eye view.

11. The system for displaying views of a vehicle and its surroundings of claim 10, wherein the memory unit is configured to store alternative views corresponding to the obstacle.

12. The system for displaying views of a vehicle and its surroundings of claim 10, wherein the view processing unit is configured to create a bird's eye view from a virtual viewpoint outside the vehicle based on views acquired by the cameras.

* * * * *